March 18, 1924.  1,487,340
N. KROUPSKY
TRACK LAYING MOTOR VEHICLE
Filed Aug. 31, 1921
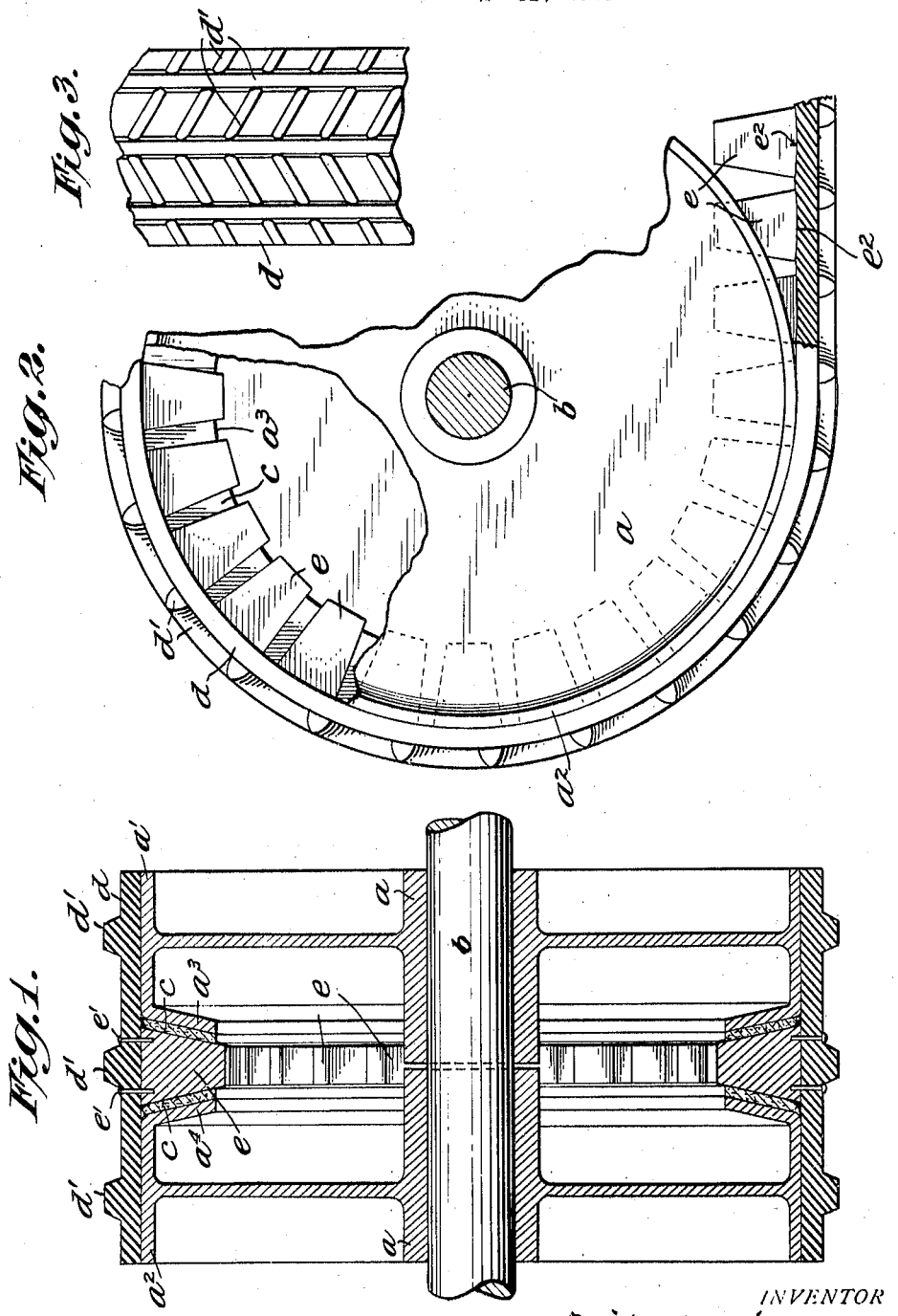

Patented Mar. 18, 1924.

1,487,340

UNITED STATES PATENT OFFICE.

NICHOLAS KROUPSKY, OF NEW YORK, N. Y.

TRACK-LAYING MOTOR VEHICLE.

Application filed August 31, 1921. Serial No. 497,086.

*To all whom it may concern:*

Be it known that I, NICHOLAS KROUPSKY, a citizen of Russia, residing in the borough of Manhattan, of the city of New York, in the State of New York, have invented certain new and useful Improvements in Track-Laying Motor Vehicles, of which the following is a specification, reference being had to the accompanying drawings, forming a part hereof.

It has been proposed heretofore in tractors of the track laying type to provide a track of nonmetallic material having some degree of resiliency in place of the usual metal tracks which are necessarily heavy and noisy and definitely limit the speed at which the vehicle can be propelled. Such a non-metallic track has, for instance, been formed of fabricated rubber provided with inwardly extending lugs of the same material and of suitable shape adapted to travel in suitable grooves formed in the treads of the driving wheels and idler rolls. While this construction may be said to have certain advantages over the use of metal tracks on metal rolls it has been found that the lugs are disadvantageous, both as regards manufacturing considerations and practical requirements in use. Their very compressibility, for instance, makes the drive impositive and after some degree of wear the slippage becomes excessive. Also, their durability is not such as to make the construction most practical under field conditions.

It is the principal object of the present invention to improve the construction of nonmetallic tracks for track laying motor vehicles and the driving elements therefor to the end that not only may the belt be manufactured with greater facility and the component parts thereof replaced with ease when necessary, but greatly improved results in operation and durability achieved.

For a fuller understanding of the invention reference is to be had to the accompanying drawings which illustrate by way of example, and in somewhat conventional form, the improvements which constitute the subject matter of the invention. In the drawings:

Figure 1 is a view in transverse section through a drive wheel indicating the relation thereto of the improved track.

Figure 2 is a view in side elevation of the wheel shown in Figure 1, part of the web and track being broken away in the interest of clearness.

Figure 3 is a detail view in plan of the tread of the track.

While this invention is not concerned with the details of construction of the drive wheel or of the idler and supporting rolls by which the track is driven and supported, the drawings show the relation of the track to a suitable drive wheel $a$. The rim of each of two wheels $a$ has tread portions $a'$, $a^2$ with proximate inwardly inclined and opposed circumferential flanges $a^3$, $a^4$ formed on the inner edges of the portions $a'$, $a^2$, respectively. The proximate faces of the flanges $a^3$, $a^4$ on the drive wheel are faced with any suitable friction material, indicated at $c$, for driving purposes as will later appear.

The improved track is indicated at $d$. In retaining all of the advantages of nonmetallic tracks, the material employed may be of fabricated rubber or the like on the tread portion of which may be molded or otherwise provided projections $d'$ to improve the ground grip as will be understood. In accordance with proposed practises a track, such as $d$, has molded on its inner surface suitable lugs adapted to be engaged in driving relation by the driving wheels and to co-operate with idler supporting or other rolls to guide the track and hold it against lateral displacement. It has been found, however, that where these lugs are of non-metallic material their compressibility makes them unsatisfactory as driven elements for engagement by the driving devices and their susceptibility to wear and distortion likewise greatly reduces the efficiency of the drive. Their life is short and the failure of any one unit makes it practically impossible to replace such unit while preserving the usefulness of the remainder of the track by reason of the homogeneous construction. These and other incidental disadvantages of such construction are eliminated by the improvements herein which consist, briefly in the application of non-metallic lugs $e$ of suitable outline to the inner surface of the track $d$ and in proper relation to the co-operating portions of the drive wheel $a$ and idler rolls these lugs $e$ are formed as truncated pyramidal blocks, the inclination of the opposed side faces corresponding to the inclination of the proximate flanges $a^3$, $a^4$ forming grooves of the drive wheel. The width of the blocks is such that the opposed side faces will be snugly embraced in driving engagement by the friction facing $c$ on the flanges $a^3$, $a^4$. The blocks themselves, of course, are so spaced and inclined, as to permit free flexing of the track $d$ when changing direction, as indicated in Figure 2. Any approved means for securing the blocks $e$ to the inner face of the track $d$, such as rivets $e'$ or the like, may be employed, the invention not being limited in this respect. In order to insure further conformation of the blocks to changes in direction of the track, it is preferable to form their bases along an arc having a radius equal to the radius of the curvature of the wheel $a$. Such a curved base is indicated at $e^2$.

The blocks $e$ are of metal and unyielding. They serve as efficient driven units for engagement by the driving fabric $c$ and are not specially susceptible to more than the ordinary degree of wear. When molded and attached to the track $d$ they conform uniformly to the drive wheel $a$ and to any idler rolls which may be provided on the vehicle. When necessary any one of the blocks $e$ may be readily removed from the track and replaced without disturbing any of the other component parts of the track or shortening its life of usefulness.

As pointed out hereinbefore changes in design and arrangement of the elements may be practised without departing from the spirit of the invention so long as such alterations fall within the scope of the appended claims.

I claim as my invention:

1. In a track laying motor vehicle drive wheels having the periphery thereof provided with inwardly extending proximate inclined flanges, separate friction means for driving purposes supported on the proximate faces of said flanges and a track passing over said wheel and provided on its inner face with a series of independent incompressible spaced blocks adapted to be engaged in driving relation with said driving means on said flanges.

2. In a motor vehicle of the track laying type, drive wheels having spaced circumferentially tread portions, proximate flanges on the rims and inwardly inclined and faced with separate friction material, a non-metallic track passing over the wheel and a series of independent incompressible spaced metal blocks of pyramidal form adapted to engage said friction material in driving relation, and means to secure the blocks to the track.

This specification signed this 26th day of August A. D. 1921.

NICHOLAS KROUPSKY.